(12) United States Patent
Binafif et al.

(10) Patent No.: US 9,451,449 B1
(45) Date of Patent: Sep. 20, 2016

(54) METHOD AND SYSTEM FOR SHARING A COMMUNICATION TERMINAL AVAILABILITY

(71) Applicants: Abdullah Hussain Binafif, Richardson, TX (US); Rami Batteh, Rochester, NY (US); Samah Balkhair, Rochester, NY (US); Fahad Albeshri, Urbana, IL (US)

(72) Inventors: Abdullah Hussain Binafif, Richardson, TX (US); Rami Batteh, Rochester, NY (US); Samah Balkhair, Rochester, NY (US); Fahad Albeshri, Urbana, IL (US)

( * ) Notice: Subject to any disclaimer, the term of this patent is extended or adjusted under 35 U.S.C. 154(b) by 0 days.

(21) Appl. No.: 14/724,614

(22) Filed: May 28, 2015

(51) Int. Cl.
*H04M 3/42* (2006.01)
*H04W 8/24* (2009.01)
*H04M 3/533* (2006.01)

(52) U.S. Cl.
CPC ........... *H04W 8/24* (2013.01); *H04M 3/53308* (2013.01)

(58) Field of Classification Search
CPC .............................. H04M 1/56; H04W 4/206
USPC ......... 455/415, 556.1, 414.1, 413, 418, 410; 379/265.13, 251; 717/173, 172; 701/23
See application file for complete search history.

(56) References Cited

U.S. PATENT DOCUMENTS

| | | | |
|---|---|---|---|
| 8,775,526 B2* | 7/2014 | Lorch | H04M 1/7253 455/556.1 |
| 8,849,264 B2* | 9/2014 | Rebstock | H04M 1/56 455/415 |
| 2012/0142318 A1* | 6/2012 | Okon | H04W 4/206 455/413 |
| 2013/0217364 A1 | 8/2013 | Varoglu et al. | |
| 2014/0087700 A1 | 3/2014 | Gudlavenkatasiva et al. | |

* cited by examiner

*Primary Examiner* — Kiet Doan
(74) *Attorney, Agent, or Firm* — Oblon, McClelland, Maier & Neustadt, L.L.P.

(57) ABSTRACT

Embodiments include a telephone system which allows a user to indicate their availability to receive phone calls and allows users to determine which other users are available to receive phone calls. The system allows for connection of phone calls between available parties, thereby eliminating unnecessary missed telephone calls and leaving and/or listening to repeated voicemails for the user. The system removes the uncertainty of whether a telephone call recipient is available eliminating frustration and wasted time for the caller. In one implementation, the system comprises an application or button installed on a telephone which may be activated to indicate to other users that the first user is available to receive and answer telephone calls via sending the caller a graphic and/or text, such as an animated icon "animaticon" showing what the user is presently engaged in doing, such as "golfing," "in a meeting," "in a class," or the like.

14 Claims, 11 Drawing Sheets

METHOD AND SYSTEM FOR SHARING A COMMUNICATION TERMINAL AVAILABILITY

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present disclosure.

BACKGROUND

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Smartphones and tablet computers or other communication terminals (user equipment) have become a part of everyday life. People use smartphones and tablet computers in many different ways. Sometimes a user may be in a situation where they cannot respond to any incoming calls. In such a case, the user or call receiver may either activate the power button on their device to give the caller a busy tone or allow the call to pass to voicemail. Alternatively, the user or call receiver may send a message that was previously set or prepared in their device to notify the caller that they are currently busy or unavailable. The problem with this first approach is that it fails to tell the caller any information about the user's or receiver's status, and thus, the caller may continue to make further attempts at calling the user or receiver many times. On the other hand, the second approach may only provide brief or inaccurate information about the receiver's current status or real-time situation from the sent message. In addition, the user or receiver may not always be able to easily access their user equipment and choose the option of sending a preset message. For example, the user or receiver may be unable to interact with their user equipment when they are in a staff meeting in which it is not appropriate to hold or utilize their user equipment, or when they are driving and safety is a clear concern.

Further, both of these approaches require that the user or receiver to respond or react in real-time during the received call to inform the caller.

SUMMARY

A first embodiment may include a system for facilitating time appropriate communication between users using network connected communication devices, comprising a receiving device having processing circuitry and memory. The system also includes a server having processing circuitry and memory. The processing circuitry of the receiving device is configured to determine availability information of a user corresponding to the receiving device, where the availability information includes an availability status for the user and a time point at which the availability status will change. The processing circuitry of the receiving device is also configured to send the availability information to the server. The processing circuitry of the receiving device is further configured to determine whether the availability status of the user has been updated and generate updated availability information when the availability status of the user has been updated. The processing circuitry of the receiving device is also configured to send any updated availability information to the server. The processing circuitry of the server is configured to receive the availability information and any updated availability information from the receiving device. The processing circuitry of the server is also configured to continuously determine the availability status of the user based on the availability information and any updated availability information. The processing circuitry of the server is further configured to forward incoming calls to the receiving device from a sending device when the availability status of the user is determined to be available. The processing circuitry of the server is also configured to direct incoming calls to voicemail from the sending device and to send a status indicator to the sending device representing of the availability status of the user when the availability status of the user is determined to be unavailable.

A second embodiment may include a method, comprising providing a mobile application including program code to be executed on a receiving device having processing circuitry and memory. The method may also include sending configuration settings to a server having processing circuitry and memory. The method may further include sending an availability status of the user via the receiving device to the server. The method may also include determining whether the configuration settings or the availability status of the user has been updated via the receiving device. The method may further include sending an updated availability status of the user via the receiving device to the server. The method may also include receiving incoming calls from a sending device having processing circuitry and memory via the server based on the updated availability status of the user.

A third embodiment may include method, comprising providing a mobile application including program code to be executed on a server having processing circuitry and memory. The method may also include receiving configuration settings via a receiving device. The method may further include receiving an availability status of the user via the receiving device. The method may also include determining whether the configuration settings or the availability status of the user has been updated via the receiving device. The method may further include intercepting and blocking incoming calls to the receiving device from a sending device and sending a status indicator to the sending device representative of the availability status of the user. The method may also include receiving an updated availability status of the user via the receiving device. The method may further include passing through incoming calls and outgoing calls to and from the receiving device and the sending device when the availability status changes from unavailable to available.

A fourth embodiment may include a non-transitory computer readable medium encoded with instructions that, when executed in hardware, perform a process. The process may include the method according to the second or third embodiments discussed above.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
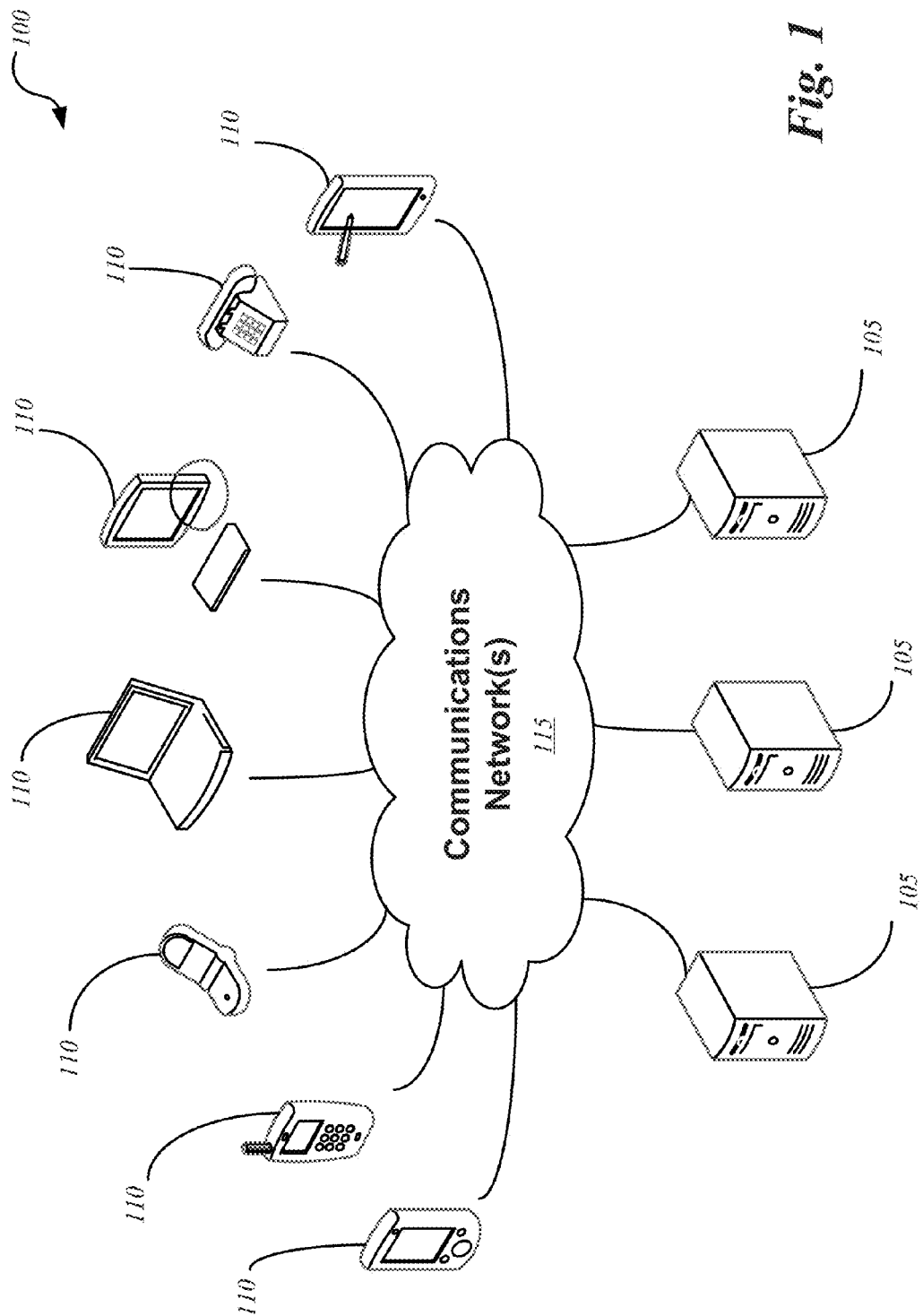
FIG. 1 is a schematic view of a communications system for sharing information regarding availability of a user equipment, according to certain embodiments of the disclosure.

Referring now to the drawings, wherein like reference numerals designate identical or corresponding parts throughout the several views.

The present disclosure provides various embodiments which implement a method and apparatus which utilize an application which changes the settings in a communication terminal or user equipment (UE) to share the availability of the user equipment of a receiver with another user equipment of a caller in real-time. User equipment may include smartphones, cellular phones, landline phones, portable digital assistants (PDAs), tablet computers, laptop computers, desktop computers or the like, which are network enabled.

The present disclosure may include a list of different statuses that describe events such as, "In a Meeting," "Playing Football," "I'm Sleeping," "In a Class," etc. A user can add more statuses and associate each status with a special picture/icon that is configured for this application purpose. The user then can set up their communication terminal or user equipment by choosing from this list a descriptive status for a predetermined timeframe. The user can also declare the time that he/she will be available. For example, if the user has a meeting for two hours, the user can set up their communication terminal or user equipment to a "In a Meeting" status before the meeting and set the will be available time to after two hours. Thus, when any incoming call comes during the meeting time, the call may be blocked/intercepted at a server node and the user equipment of the caller will receive a graphic indicator, such as an animated icon or "animaticon," that indicates that the call receiver is in a meeting, and the graphic indicator may also show the time at which the call receiver will become available for calls. The information or graphic indicator sent to the caller may not require any real-time action by the communication terminal or user equipment owner (call receiver).

In some embodiments, a "will be available" message may be sent by the user equipment of the call receiver to the caller and this message may alternatively indicate will not be available in 10 minutes, 20 minutes, etc., for example, or any preset time frame determined by the user. In other embodiments, a caller, upon receiving the call receiver's message, may submit an emergency request option to push their call through to the call receiver for emergency purposes.

As mentioned above, the graphic indicator may be configured as an animated icon which shows on the user equipment of the caller when calling a user who has set up their user equipment via the application to show a particular status. For example, if a user is playing football, anyone calling the user may see an animated icon of a person playing football with an indicator showing the time for which the user is available for a call. The animated icons may include, but are not limited to, "In a Meeting," "I'm Sleeping," "At the Movies," "I'm Driving" and "In Flight" on an airplane. Further, the animated icon may be configured to change form, color and/or motion to indicate that the user is now available. This change may also include an audible alert to the caller to indicate that the user is now available.

The present disclosure may have numerous applications, for example, one of its options may be to set regular events of the user in a way it activates the communication terminal or user equipment automatically during weekly or monthly preset event times. For example, a student could set a class status to be activated when the student is in class based on their class schedule or the like. Therefore, the student will not be concerned about setting up their communication terminal for each and every class time or schedule.

FIG. 1 is a schematic view of a communications system 100 for sharing information regarding availability of communication terminals 110, according to certain embodiments of the disclosure. In FIG. 1, the present disclosure provides various embodiments of a computer program, a method, and a system for sharing information about the time availability of a telephone user. The computer program and the method of embodiments of the present disclosure may be implemented in hardware, software, firmware, or combinations thereof using system 100, shown in FIG. 1, which broadly comprises server devices 105, communication terminals or user equipment 110, and a communications network 115. The server devices 105 may provide access to one or more general computing resources, such as Internet services, electronic mail services, data transfer services, mobile communications services, and the like. The server devices 105 may also provide access to a database that may store content and other information, such as user statuses, telephone numbers, contact lists, or other information necessary for the operation of the computer program, method, and system of the present disclosure.

The communication terminals or user equipment 110 may include any device, component, or equipment with a processing element and associated memory elements. The processing elements may implement operating systems, and may be capable of executing a computer program, which is also generally known as instructions, commands, software code, executables, applications, apps, and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements included in the user equipment 110, the server devices 105 may further include file storage comprising a plurality of hard disk drives, network attached storage, or a separate storage network.

The user equipment (UE) 110 may include mobile communication devices (including wireless devices), work stations, desktop computers, laptop computers, palmtop computers, tablet computers, portable digital assistants (PDA), smartphones, and the like, or combinations thereof. Specifically, various embodiments of the user equipment 110 may also include voice communication devices, such as cell phones or landline phones. The user equipment 110 may have an electronic display, such as a cathode ray tube, liquid crystal display, plasma, or touch screen. In certain embodiments, the computer program of the present disclosure may facilitate interaction and communication through a graphical user interface (GUI) that is displayed via the electronic display.

The communications network 115 may be wired or wireless and may include servers, routers, switches, wireless receivers and transmitters, and the like, as well as electrically conductive cables or optical cables. The communications network 115 may also include local, metro, or wide area networks, as well as the Internet, or other cloud networks. Furthermore, the communications network 115 may include cellular or mobile phone networks, as well as landline phone networks or public switched telephone networks.

Both the server devices 105 and the user equipment 110 may be connected to the communications network 115. Server devices 105 may be able to communicate with other server devices 105 or user equipment 110 through the communications network 115. Likewise, user equipment 110 may be able to communicate with other user equipment 110 or server devices 105 through the communications network 115. The connection to the communications network 115 may be wired or wireless. Thus, the server devices 105 and the user equipment 110 may include the appropriate components to establish a wired or a wireless connection.

The computer program or application of the present disclosure may run on the user equipment or, alternatively, may run on one or more server devices 105. Thus, a first portion of the program, code, or instructions may execute on a first server device 105 or the user equipment 110, while a second portion of the program, code, or instructions may execute on a second server device 105 or the user equipment 110. In some embodiments, other portions of the program, code, or instructions may execute on other server devices 105 as well. For example, a status of the user, which is described in more detail below, may be stored on a memory element associated with the server device 105, such that the status may be provided to user equipment 110 via the server. Alternatively, the user status may be stored on the memory element associated with the user equipment 110 of the user.

In embodiments of the present disclosure, a downloadable version of the computer program may be stored, at least in part, on the server device 105. A user can download at least a portion of the computer program onto a user equipment 110 via the network 115. In embodiments of the present disclosure, the computer program is an "application," such as an "app" for a mobile device or communication terminal. After the computer program has been downloaded, the program can be installed on the user equipment 110 in an executable format. In additional embodiments, the computer program of the present disclosure may be pre-installed by a manufacturer of the user equipment 110 during the equipment's manufacture, such that the computer program is part of the user equipment's factory installed software.

Figure 2:
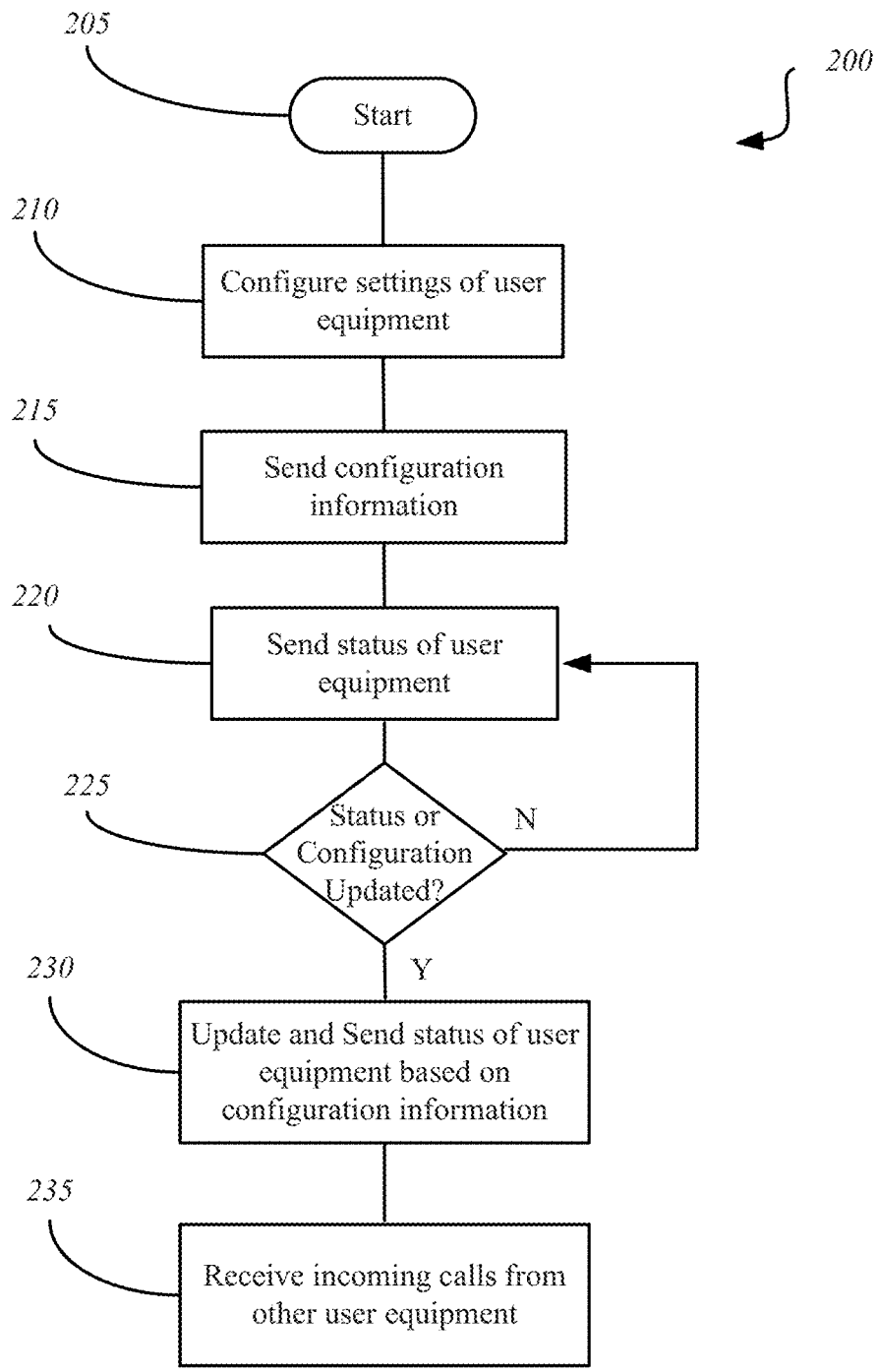
FIG. 2 is a flowchart illustrating a method for sharing the availability of a user equipment according to certain embodiments of the disclosure.

FIG. 2 is a flowchart 200 illustrating a method for sharing the availability of a user equipment 110 according to certain embodiments of the disclosure. In FIG. 2, at 205 an application, such as a mobile application is triggered to start on user equipment 110, for example by touchscreen activation. At 210, settings are configured on user equipment 110, for example via a settings menu within the application, for example see FIG. 6A at 600, 605. In some embodiments, through the settings menu, the user may configure an auto-reply mode to send availability indicators to the sender device or user equipment 110 of the caller. At 215, the configuration of user equipment 110 is sent to the server device 105, for example, a gateway server of an Evolved Node B (eNodeB) (see FIG. 9 at 910). At 220, the status of the user equipment 110 is sent to the server device 105. At 225, the system determines whether a configuration or status update has been implemented by the user equipment 110, if not, the application maintains present status for the user equipment 110. At 230, if a configuration or status update has been implemented by the user equipment 110, then the updated status of the user equipment 110 is sent to the server device 105 based on the configuration information at 215. At 235, user equipment 110 receives incoming calls from other user equipment.

As illustrated in FIG. 2, embodiments of the present disclosure comprise an initial Step 210 of configuring settings of the user equipment 110 indicative of a user's schedule or availability. This availability may be customizable per caller. For example, certain calls from predetermined callers may be prioritized to pass through to user equipment 110 of the receiver for emergency or other purposes. In Step 215 user equipment 110 sends the configuration information of Step 210 to a server node. In Step 220 user equipment 110 sends status information indicative of a status of the user, with the status representing an availability of the user to accept or participate in a telephone call. In Step 225, embodiments of the application may be configured to continually check or query whether the status or configuration of user equipment 110 has changed. In Step 230, embodiments of the application may be configured to update and send the status of the user equipment 110 to the server device 105 based on the configuration information at Step 215. In Step 235, user equipment 110 is allowed to receive incoming calls from other user equipment 110 (see FIG. 9).

Initially, at least one status is set via the user equipment 110 of the receiver, using a software application of embodiments of the present disclosure. The status may contain information about the current availability, future availability, or busy status of user or the user's ability to accept or decline phone and/or video calls.

The caller who has made a phone and/or video call to the user, via user equipment 110, is provided with a real-time graphic, textual, and/or audio notice, or representation, of the user's status. The graphic representation may comprise symbols, animated icons and/or text. The textual representation may include alphanumeric characters, symbols, or the like. The audio representation may comprise voice, beeps, rings, etc. The user's status is provided either after the user's phone number is displayed in the caller's contacts list and/or after the caller dials the user's phone number, which is otherwise not entered in the caller's contacts list. In certain embodiments of the present disclosure, after the user's phone number is displayed in, or dialed by, the user equipment 110 of the caller, the user equipment 110 of the caller may query the user equipment 110 of the receiver and/or the server device 105 (which may be virtually in the "cloud"), using the network 115. In response to the query from the user equipment 110 of the caller, the server device 105 may query the user equipment 110 of the receiver to obtain information regarding the receiver's status. Thereafter, the server device 105 may provide the receiver's status to user equipment 110 of the caller. In additional embodiments of the present disclosure, the user's status may be continually provided, or periodically updated, for example, every 5, 10, 30, or 60 seconds, to the server device 105 via the network 115. In such an embodiment, upon the caller displaying, or dialing, the user's phone number in the caller's contacts list, the status of the user is automatically sent from the server device 105 to the user equipment 110 of the caller, similar to an on-demand feature. In even further embodiments, the user's status may be continually provided, or periodically updated, such as every 5, 10, 30, or 60 seconds, to the server device 105, and the status may be continually provided, or periodically pushed, such as every 5, 10, 30, or 60 seconds, to the user equipment 110 of the caller or alternatively, when the caller calls the user even when the number is in the caller's phone. In such an embodiment, the user equipment 110 of the caller would continuously, or periodically, receive the user's status, such that the user equipment 110 of the caller would not be required to query either the server device 105 or the user equipment 110 of the receiver each time a receiver's status is needed.

Figure 3:
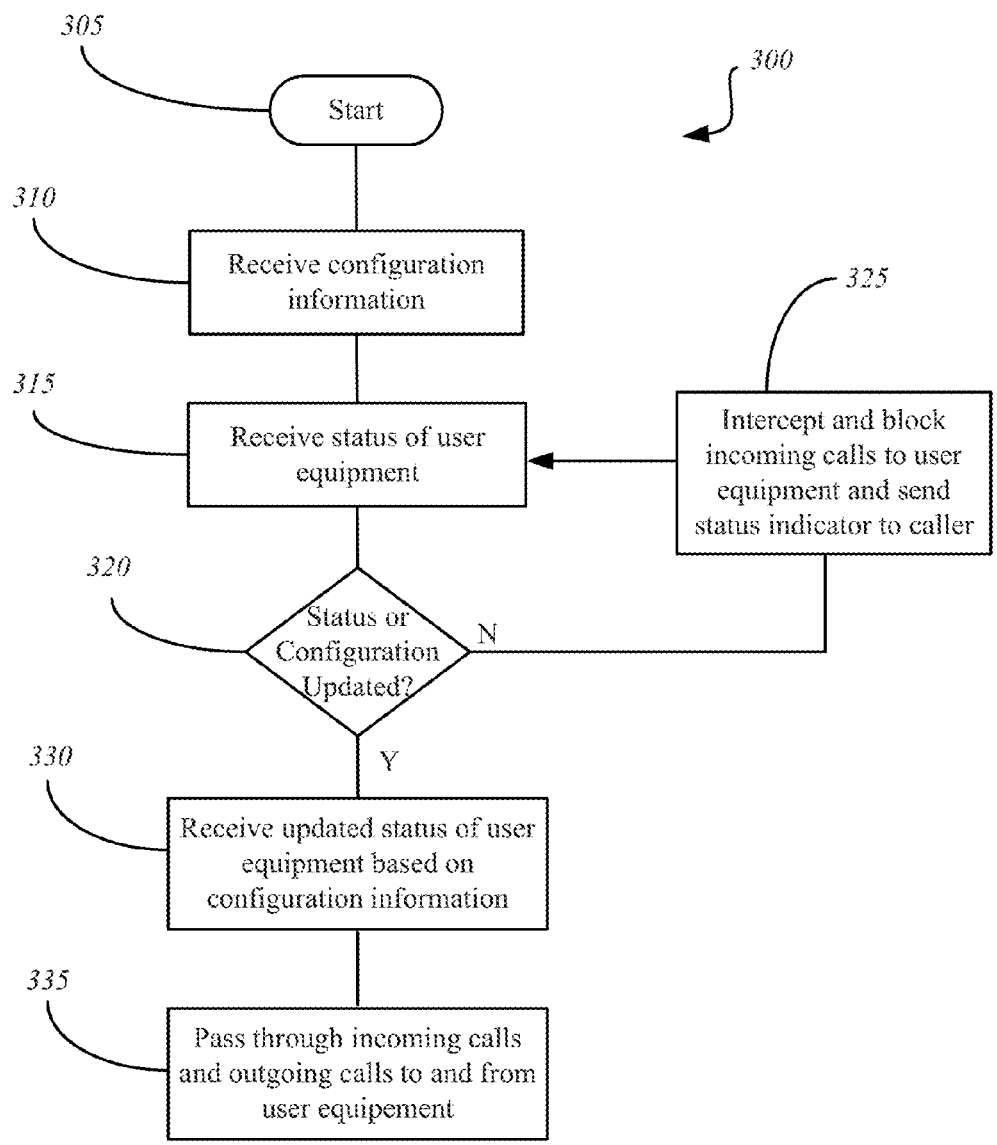
FIG. 3 is a flowchart illustrating a method for sharing the availability of a user equipment according to other embodiments of the disclosure.

FIG. 3 is a flowchart 300 illustrating a method for sharing the availability of user equipment 110 according to another embodiment of the disclosure. In FIG. 3, at 305 an application is triggered to start on a server device 105, for example a gateway server of an evolved NodeB (eNodeB). At 310, configuration information from user equipment 110 is received at server device 105. At 315, the status of user equipment 110 is received at server device 105. At 320, the system checks whether a configuration or status update has been received and implemented by user equipment 110. At 325, server device 105 receives an indication that user equipment 110 of a caller has made a telephone call to the user equipment 110 of the receiver. Server device 105 is configured to block or intercept based on the current status of the user equipment of the receiver. Upon receiving information indicative of the user equipment 110 of the caller has made a telephone call, the caller is provided with a notice indicative of the receiver's status in the form of a graphic, textual, and/or audio representation. At 330, if a configuration or status update has been received and implemented by the user equipment 110 of the receiver, then the updated status of user equipment 110 is processed by the application at the server device 105 based on the received configuration information. At 335, the server device 105 allows or passes through incoming calls and outgoing calls to and from user equipment 110.

Figure 4:
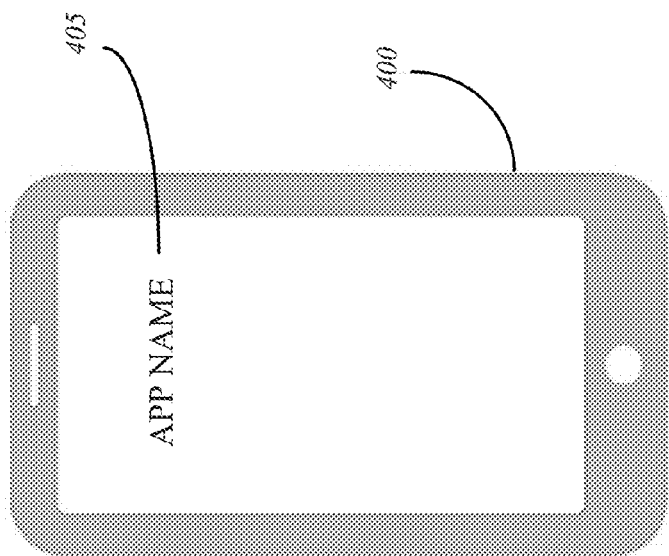
FIG. 4 is an illustrative view of a user equipment of a receiver displaying a mobile application according to certain embodiments of the disclosure.

FIG. 4 is an illustrative view of a user equipment 400 of a receiver displaying a mobile application 405 according to certain embodiments of the disclosure. In FIG. 4, user equipment 400 may be configured to implement the steps of flowchart 200, as discussed above when activating mobile application 405. It should be noted that user equipment 400 may correspond to any of user equipment 110 discussed above.

In some embodiments, the caller may select if they wants the mobile application to send them a message or alert sound as a reminder when the receiver of the call is available. In other words, the user or receiver may configure the mobile application to send a message telling the caller that the receiver is now available.

In other embodiments, the mobile application may be configured to allow the receiver or user to selectively choose or indicate a reply language based on the caller's known language. Thus, the sent reply to any incoming call may be customizable to the caller's language, such as Spanish, French, Chinese, etc.

In certain embodiments, the user may select animated icons based on the gender of the caller. In other words, if a female is at a hair salon, then she can send a hair stylist or salon icon or animation to the caller.

In some embodiments, the user can select who can see the animation icon or message, otherwise the user can make the animation icon or message universally viewable to any caller.

Certain embodiments provide a mobile application configured to allow a maximum of 150 characters and in some embodiments, the message to the caller may be audible as well as an animated icon.

Still in other embodiments, the mobile application may be configured to notify the receiver that the caller has read the notification, that is, animation icon and/or message reply to the incoming call.

The mobile application may be configured to acquire additional animation icons from a purchase point, such as an app store or the like. Further, sounds may be added to the animation icons to let the caller be aware that the receiver is now available or free to communicate or take incoming calls.

Figure 5:
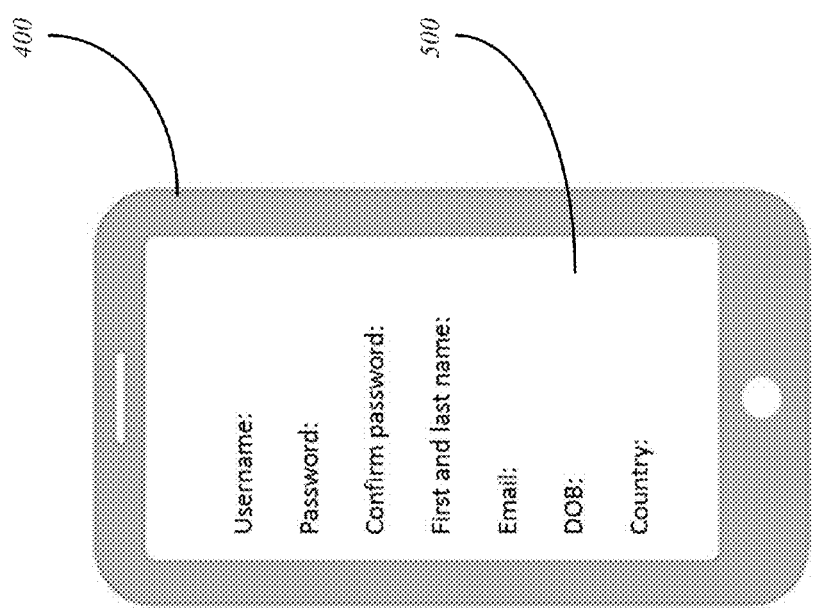
FIG. 5 is an illustrative view of a user equipment of a receiver displaying a sign-up screen of a mobile application according to certain embodiments of the disclosure.

FIG. 5 is an illustrative view of user equipment 400 of a receiver displaying a sign-up screen 500 of mobile application 405 according to certain embodiments of the disclosure. In FIG. 5, sign-up screen 500 may include identifiers such as, a user name, a password, a password confirmation, first and last name, email address, date of birth (DOB), country, etc. to be used within mobile application 405.

Figure 6A:
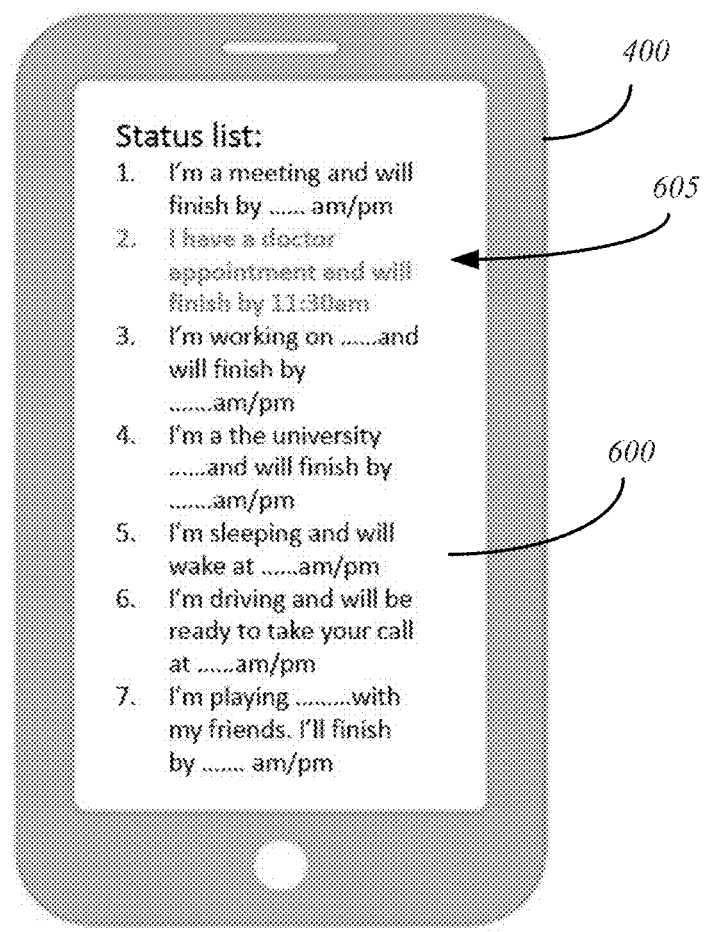
FIG. 6A is an illustrative view of a user equipment of a receiver displaying a status selection list to be sent to a user equipment of a caller according to certain embodiments of the disclosure.

FIG. 6A is an illustrative view of user equipment 400 of a receiver displaying a status selection list 600 to be sent to a user equipment of the caller according to certain embodiments of the disclosure. In FIG. 6A, by way of example, shows a selected status at 605 of "I have a doctor appointment and will finish by 11:30 am" to be sent to server device 105 and relayed to preselected or all incoming callers as desired by the user or receiver. For instance, when a user or receiver has a doctor's appointment from 10 am to 11:30 am the receiver may enter their meeting or appointment via a status selection list 600 and then select a status which most closely fits and then enter or edit the start and stop times to update their availability. In some embodiments the status selection list 600 may be preprogrammed as well as editable for customization purposes.

Figure 6B:
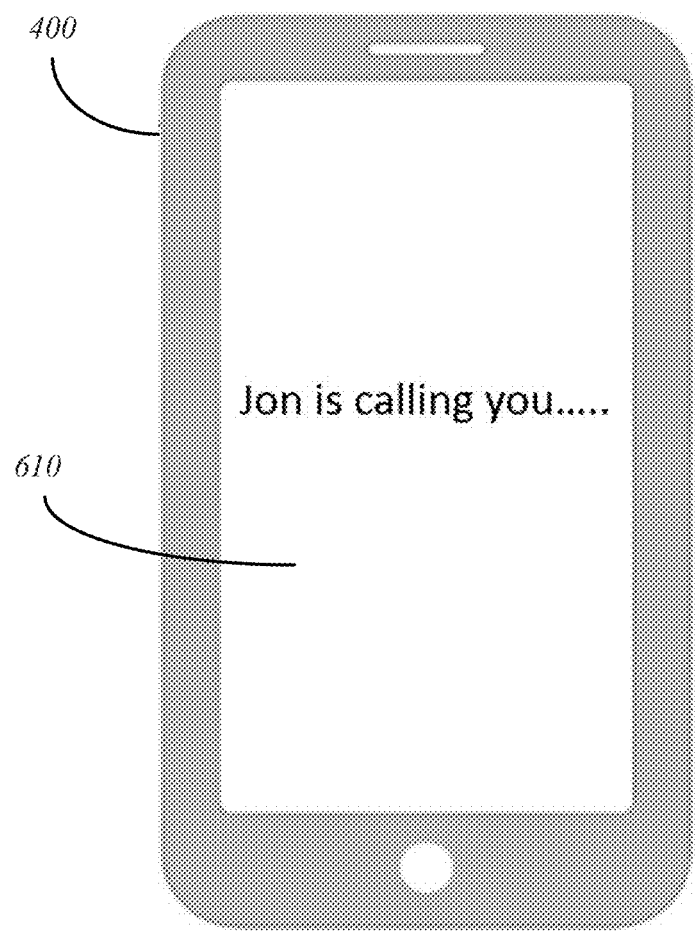
FIG. 6B is an illustrative view of a user equipment of a receiver displaying an incoming message indicator according to certain embodiments of the disclosure.

FIG. 6B is an illustrative view of user equipment 400 of a receiver displaying an incoming message 610 according to certain embodiments of the disclosure. In FIG. 6B, incoming message 610 showing, by way of example, "Jon is calling you . . . " may be deactivated from appearing on the receiver's phone but only stored for later retrieval once the receiver or user is available to view or respond in kind.

Figure 7:
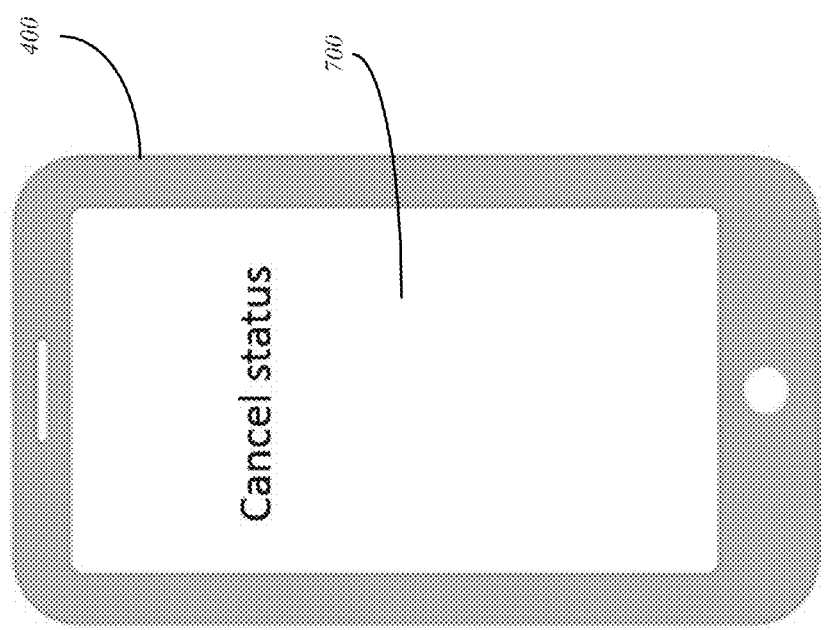
FIG. 7 is an illustrative view of a user equipment of a receiver displaying a status cancellation indicator according to certain embodiments of the disclosure.

FIG. 7 is an illustrative view of user equipment 400 of a receiver displaying a status cancellation 700 according to certain embodiments of the disclosure. In FIG. 7, the application 405 may include a status cancellation screen 700 in which the user or receiver may wish to cancel a current status. For example, if the user's doctor's appointment ends early, then the user may wish to receive incoming calls sooner than the preset or scheduled availability status sent by their user equipment 400.

Figure 8:
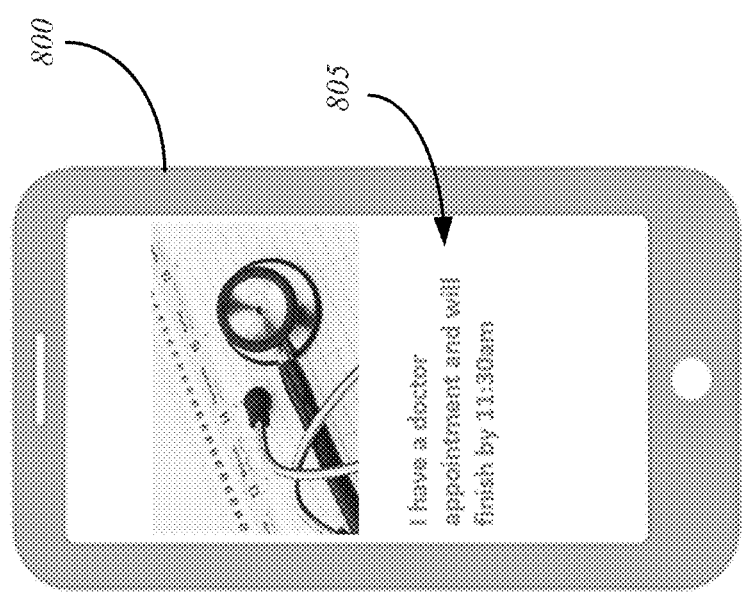
FIG. 8 is an illustrative view of a user equipment of a caller displaying a status received from a user equipment of a receiver according to certain embodiments of the disclosure.

FIG. 8 is an illustrative view of a user equipment 800 of a caller displaying a received status indicator 805 from user equipment 400 of a receiver according to certain embodiments of the disclosure. In FIG. 8, the status indicator 805, by way of example, shows "I have a doctor appointment and will finish by 11:30 am" and an icon which corresponds to the selected status at 605 in FIG. 6A to be displayed on the user equipment 800 of the caller. The status indicator 805 is sent directly to the caller while activated by the user or call receiver. It should be noted that user equipment 800 may correspond to any of user equipment 110 discussed above. In addition, the user may select different messages for different people or classes of people, for example, family sees a message "At the doctor" while others see a message of "Busy" for the same activity and time period.

The status indicator 805 may be configured to be either a static icon or graphic or an animated icon or graphic indicative to the activity or status of the user or call receiver. In some embodiments, the user or call receiver may preselect via the application 405 to whom the status indicator 805 will be sent as well as to which callers may have their calls connected directly without the use of status indicator 805. In other embodiments, the user can select different messages for different people or classes of people, for example, family may receive the message "At the doctor" while others receive the message "Busy" for possible privacy reasons.

Figure 9:
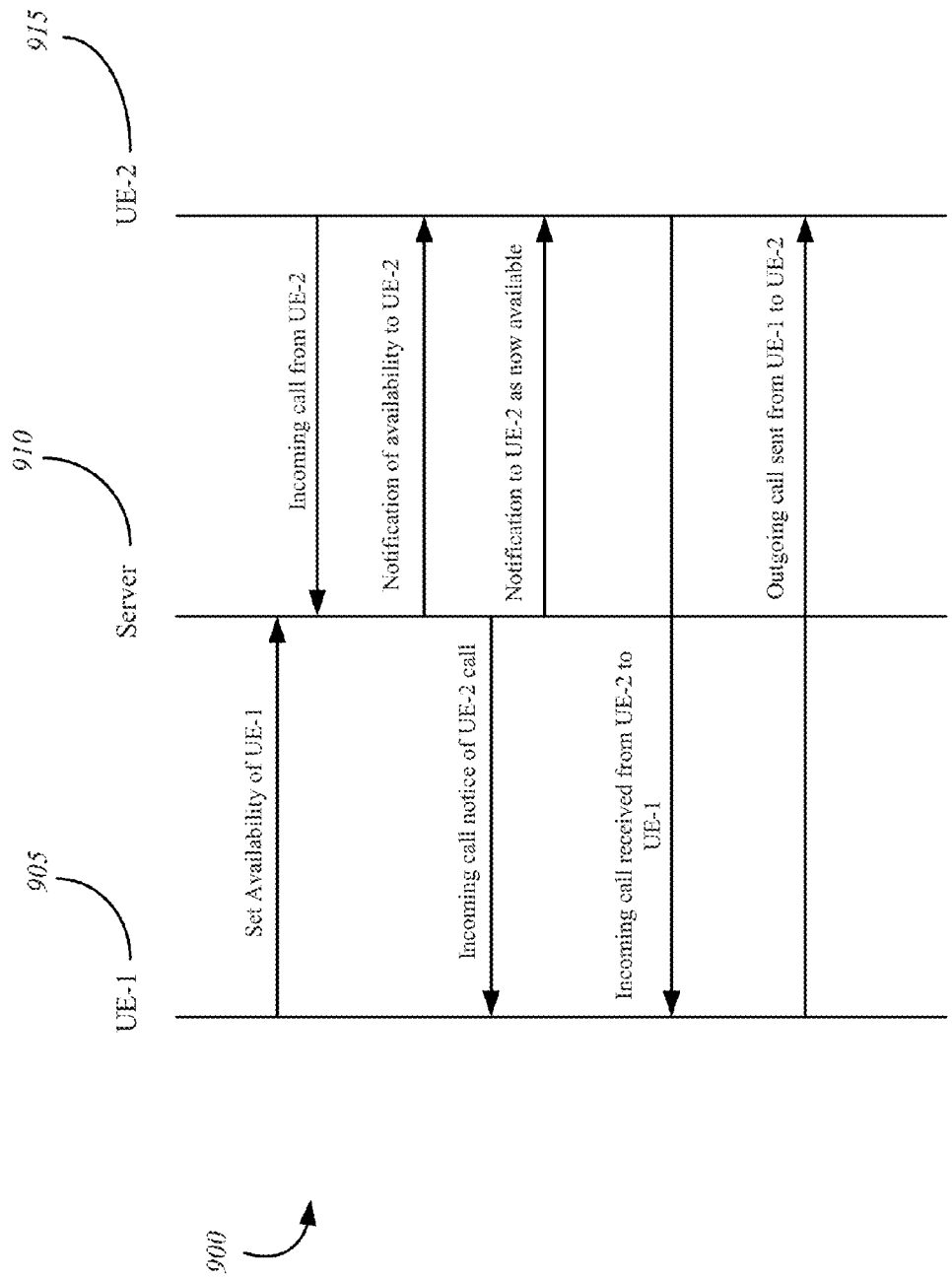
FIG. 9 is signal flow diagram illustrating a signal flow sequence between a user equipment of a receiver and a user equipment of a caller at a server node according to certain embodiments of the disclosure.

FIG. 9 is signal flow diagram 900 illustrating a signal flow sequence between a first user equipment (UE-1) 905, a server node (eNodeB) 910, and a second user equipment (UE-2) 915 according to certain embodiments of the disclosure. In FIG. 9, first user equipment 905 may be configured via application 405 to set and send its availability to server node 910. When second user equipment 915 makes an incoming call to first user equipment 905, server node 910 blocks or intercepts the incoming call and sends a notification of availability to second user equipment 915. Next, if activated, an incoming call notice of the second user equipment 915 call may be sent to first user equipment 905. Once, first user equipment 905 becomes available based on the set availability sent to the server node 910, then a notification is sent to second user equipment 915 indicating that first user equipment 905 is now available. This may occur either due to the set availability timeframe set by the user or by the user cancelling the same. Next, the incoming calls from second user equipment 915 are allowed to pass through to first user equipment 905 as usual. Further, outgoing calls may pass through from first user equipment 905 to second user equipment 915. Also, application 405 may be configured to allow any emergency calls, such as hospital, fire or police, to pass through server node 910 to first user equipment 905 without delay.

Figure 10:
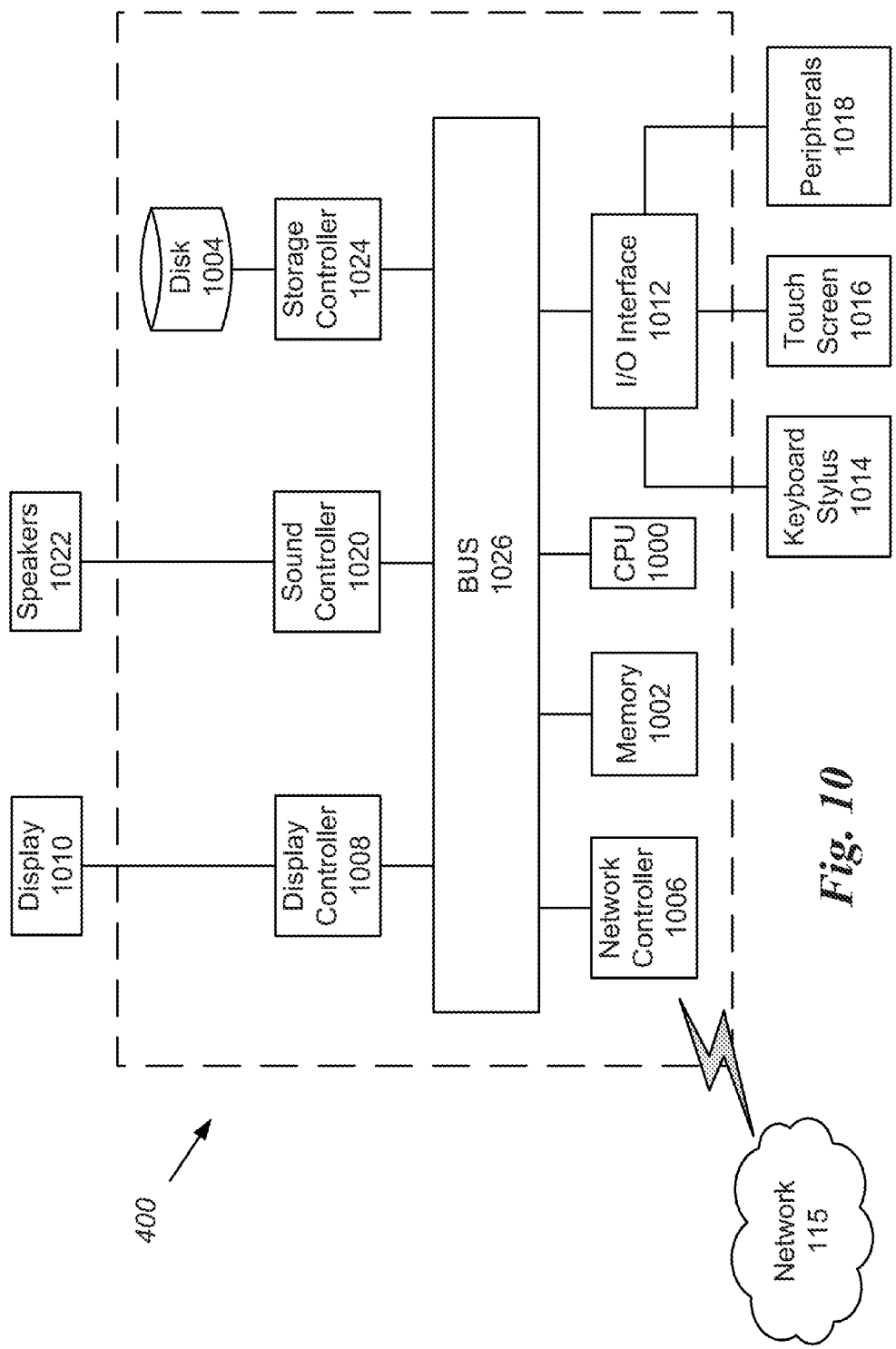
FIG. 10 is a block diagram of components and a network link of a user equipment according to certain embodiments of the disclosure.

FIG. 10 is a block diagram of components and a network link of a communication terminal according to certain embodiments of the disclosure. FIG. 10 depicts, a hardware description of the user equipment 110 according to exemplary embodiments is described with reference to FIG. 10. In FIG. 10, the communication terminal includes a CPU 1000 which performs the processes described above. The process data and instructions may be stored in memory 1002. These processes and instructions may also be stored on a storage medium disk 1004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the communication terminal communicates, such as a server or computer.

Further, the claimed advancements may be provided as a utility application, background daemon, or component of an operating system, or combination thereof, executing in conjunction with CPU 1000 and an operating system such as Microsoft Windows 7, UNIX, Solaris, LINUX, Apple MAC-OS and other systems known to those skilled in the art.

CPU 1000 may be a Xenon or Core processor from Intel of America or an Opteron processor from AMD of America, or may be other processor types that would be recognized by one of ordinary skill in the art. Alternatively, the CPU 1000 may be implemented on an FPGA, ASIC, PLD or using discrete logic circuits, as one of ordinary skill in the art would recognize. Further, CPU 1000 may be implemented as multiple processors cooperatively working in parallel to perform the instructions of the inventive processes described above.

The communication terminal in FIG. 10 also includes a network controller 1006, such as an Intel Ethernet PRO network interface card from Intel Corporation of America, for interfacing with communications network 115. As can be appreciated, the communications network 115 can be a public network, such as the Internet, or a private network such as an LAN or WAN network, or any combination thereof and can also include PSTN or ISDN sub-networks. The communications network 115 can also be wired, such as an Ethernet network, or can be wireless such as a cellular network including EDGE, 3G and 4G wireless cellular systems. The wireless network can also be WiFi, Bluetooth, or any other wireless form of communication that is known.

The communication terminal further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or stylus 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the communication terminal, such as Sound Blaster X-Fi Titanium from Creative, to interface with speakers/microphone 1022 thereby providing sounds and/or music.

The general purpose storage controller 1024 connects the storage medium disk 1004 with communication bus 1026, which may be an ISA, EISA, VESA, PCI, or similar, for interconnecting all of the components of the communication terminal. A description of the general features and functionality of the display 1010, keyboard and/or stylus 1014, as well as the display controller 1008, storage controller 1024, network controller 1006, sound controller 1020, and general purpose I/O interface 1012 is omitted herein for brevity as these features are known.

Alternatively, a user equipment 110 of caller may include a contacts list and within the contacts list may be graphic representations of statuses of a grouping of users included in the caller's contacts list. The statuses may be displayed adjacent to each of the users' names. For example, a checkmark enclosed in a circle may be provided adjacent to an identified user name. In certain embodiments, the checkmark may represent that the identified user is currently available to answer phone and/or video calls. In addition, a minus sign enclosed in a circle may be provided adjacent to an identified user name. In certain embodiments, the minus sign may represent that the identified user is currently busy or unavailable to answer phone and/or video calls. A question mark enclosed in a circle may be provided adjacent to an identified user name. In certain embodiments, the question mark may represent that the identified user is currently away or has an unclear status. A plain circle without a mark embedded may be provided adjacent to an identified user. In certain embodiments, the plain circle may represent that the identified user is currently refusing to share a status or that the user does not have the computer program embodiments of the present disclosure installed on the their user equipment 110.

In addition to the graphic symbols that represent the users' statuses, the circles enclosing the symbols may include a plurality of colors or color patterns that further represent the status. For instance, the checkmark may be enclosed in a green circle, with the green circle representing availability. The minus sign may be enclosed in a red circle, with the red circle representing unavailability. The question mark may be enclosed in a yellow circle, with the yellow circle representing an away or unclear status. The plain circle may include an area with a gray, black, or white color, with such colors representing a refusal or inability to determine a status. However, such color examples are provided for exemplary purposes only, and embodiments of the present disclosure may include the use of a plurality of colors.

In embodiments of the present disclosure, the status may further include a time and/or date on which the user will be available for an incoming call. The status may also include any graphic, textual, and/or audio message entered by the user. Such embodiments are advantageous for the optimization of the caller's time schedule, as the caller will know when it is best to repeat the call to the user. For instance, the contact list may include an availability date and time adjacent to the identified user name, with the availability date and time signifying that the identified user will be available for a phone and/or video call after "3:00 p.m. on Sep. 4, 2014." In addition, the contact list may include an availability statement adjacent to the identified user name, with the availability statement signifying that the identified user name has provided a "Let's talk!" statement to the caller.

Due to the generality of the design, embodiments of the present disclosure may be used by all persons with user equipment 110 connected to the network 115, if the user equipment 110 enables the starting and execution of software applications. Depending on the requirements of the user and/or the nature of the user equipment 110 of the receiver, such as business or private, embodiments of the present disclosure may also provide for various visibility conditions to be set for sharing the user's status among different callers. Depending on the user's requirements, the status can be set as public, that is, the status is visible to all callers according to the procedure specified above. The status may also be semi-public, that is, the status is only visible to callers whose phone numbers have been entered in the contacts list of the user equipment 110 of the receiver. The third option is a private status, that is, the status is only visible to callers specifically selected and marked in the user equipment 110 of the call receiver, such as family may see the status of "At the doctor" while others may see the status of "Busy" for possible privacy reasons. The public status, may for example, be used by professionals or public officers, such that whoever may need to call such users will be able to see whether the users are available for a call. Semi-public status may, for example, be used among friends or associates. And finally, private status may be ideal for family members. In addition, in certain embodiments of the present disclosure, multiple visibility conditions may be set simultaneously. For instance, on holidays, the user may set the public status to unavailable, while the semi-public or private status may simultaneously show availability. In some embodiments the user equipment to behave differently according to certain classes of locations, such as when at school, at work, at the movies, on a golf course, etc. In other words, the user equipment 110 may be configured to "know" where it is and does not need to be set by the user. In other embodiments, the user equipment 110 may include a set-up period in which the user equipment 110 "learns" via machine learning techniques. In other words, user equipment 110 may be configured to learn or track the user via location, time of day, etc. where and what the user typically is occupied doing and then user equipment 110 may be configured to generate and provide suggestions for activity icons or the like to be sent to a caller to indicate status.

Embodiments of the present disclosure provide for users to set their statuses manually, via manipulation of their user equipment 110. In additional embodiments of the present disclosure, statuses may be set automatically, depending on for instance: the user-selected type and/or volume of a ringtone of the user equipment 110, the call profile of the user equipment 110 of the receiver, the user equipment 110 being switched off, the user currently using the user equipment 110 for a call, the user equipment 110 being disconnected from the communications network 115, or the user equipment 110 otherwise losing a cellular signal. For instance, the contact list may include an automated availability message adjacent to the identified user name, with the automated availability message providing that the identified user is currently out of cellular network range or the user equipment 110 of the receiver is in airplane mode. Such automated availability message may be set automatically when the identified user travels out of cellular signal coverage or turns the user equipment 110 to airplane mode. Embodiments of the present disclosure provide advantages that include being simple to use and saving the user's or caller's time. In addition embodiments of the present disclosure also provide for automatically displaying unavailability due to depletion of the user equipment battery or loss of the phone operator's signal, which users may not be aware of.

If a caller has previously made an unsuccessful attempt at calling a user, embodiments of the present disclosure may provide for the user equipment 110 to alert the caller about the availability of the previously unavailable user. In such an embodiment, the alert, or follow-up notice, may be provided according to the time and/or date from when the user's initial status was provided. For instance, the follow-up notice may be provided after the elapse of thirty minutes from the time the initial status was provided. Or, for instance, the follow-up notice may be provided either at some specified time or in advance of a specified time, as the user and/or caller may define. In addition, the alert, or follow-up notice, may have the form of a single or repeating event.

The availability alert, or follow-up notice, of a previously unavailable user may be displayed via the user equipment 110 of the caller. The user equipment 110 of the caller may display the follow-up notice in the form of marking the user's current and/or future availability in an electronic or on-line calendar, in a contacts list, in the list of the called numbers, or in the graphic user interface of another application and/or user equipment 110. Such other user equipment 110 may, for instance, include telephones, PCs, tablets, TV sets, or the like. It is also possible to make use of laptops, notebooks, monitors, watches, electronic glasses, music players and other peripherals and hands-free devices, etc., including digital displays and displays in cars, aircraft, trains and other vehicles. Thus, the status change can be viewable to a caller without the caller having to watch their user equipment 110. This is ideal for user optimization, long-term time efficiency, and the time and cost savings of both users and callers. It is also convenient for users and callers using more devices for phone and video calls and/or users and callers who are not able and/or willing to answer every phone call at a specific time.

Further, the present disclosure may include an algorithm set in executable code to notify callers when the user is available in a random or preselected order to prevent or reduce all callers calling the user at the same time or instance when available.

Computer program embodiments of the present disclosure may be an integral part of produced and/or manufactured user equipment 110, or the operating system and/or software application of such user equipment 110. Additionally, computer program embodiments may be installed subsequently by the user or the caller, or by a third party with the user's or caller's consent, such as an "app store" download authorization. Thus, the computer program of embodiments of the present disclosure may either be included in the factory settings of the user equipment or may be installed into already existing user equipment 110. As described above, embodiments of the present disclosure are applicable to all networks, whether telephone (wireless networks, satellite telephone network, cable or wired networks), as well as on the Internet, TV networks, etc.

The embodiments of the present disclosure for sharing information about the time availability of a user equipment 110 user serves especially for time optimization and the cost saving for those who make use of it. Thus, users and callers can plan their phone and/or video calls and minimize the risk of trying to repeatedly reach a user who is not and/or will not be able to answer the incoming call. Due to the user's availability being displayed prior to the call, the time savings are also accompanied with the saving of the cost of calls where the called user merely informs the caller that the user is currently busy and cannot talk.

EXAMPLES

Example 1

As an example of embodiment of the present disclosure for sharing information about the time availability of a user of user equipment 110, initially the user sets a status using the user equipment 110. In the present example, this may have been initiated at the start of a business meeting. The status comprises information about the unavailability, or busy status, of the user and about the user's inability to answer or reject phone calls. The status may include the date and time that user will be available, which may be for instance at "3 p.m. on Sep. 5, 2014." Once the user has entered the status on the user equipment 110, information indicative of the status may be received by the server 105 via the communications network. In addition to the status, the user may also select a public visibility condition, information indicative of which, is also received by the sever 105. For instance, the public visibility condition provides for the user's status to be provided to all callers.

Next, a caller who is preparing to make a phone call to the user is provided with a real-time graphic, textual and/or audio notice of the user's status. The notice is provided to the caller after the caller displays the user in the contacts list of the user equipment 110 of the caller. For instance, in the present example, the user may be identified as Third Sample Name in the caller's contacts list of user equipment 110. A notice of the user's status may be provided to the user equipment 110 of the caller from the server 105 via the network 115. The notice provides an indication that the user is currently busy or unable to answer a phone and/or video call, but will be available after "3:00 pm on Sep. 5, 2014."

Next in the present example, at 2:55 p.m., the user equipment 110 of the caller may alert the caller about an upcoming availability of the previously unavailable user, whom the caller previously attempted to call, without success. The alert, or follow-up notice, may be provided to the user equipment 110 of the caller from the server 105 via the network 115. The follow-up notice is based on an availability time and date that was included in the status of the user. At 3 p.m., the user equipment 110 of the caller may repeat the follow-up notice.

Because the user equipment 110 of the receiver enables the display of alphanumeric characters, symbols, status animated icons, and/or other messages set by the user, embodiments of the present disclosure may be an integral part of factory produced user equipment 110, or its operating system and/or software applications.

Example 2

As an additional example of embodiments of the present disclosure for the process of sharing information about the time availability of a user of a user equipment 110, the user, during a weekend, sets two statuses using a user equipment 110. A first status is public, while a second status is semi-public. The first status comprises information about the unavailability of the user and about the user's inability to answer phone and/or video calls. Furthermore, the first status may include the date and time that user will be available for incoming calls, which is provided as "Monday at 8 a.m." The first status is provided to those potential callers, whose numbers are not entered in a contacts list of the user equipment 110 of the receiver. The second status contains information about the current availability of user and the user's ability to accept or decline phone and/or video calls. The second status is provided to those potential callers whose numbers are entered in a contacts list of the user equipment 110 of the receiver.

A first caller, via a user equipment 110, whose phone number is not entered in the list of contacts of the user equipment 110 of the receiver and who is preparing to make a phone call to the user, is provided, after displaying the phone number of the user in a list of contacts in the first user equipment 110 of the caller, with a real-time graphic, textual, and/or audio notice of the first (public) status of the user.

Subsequently, during the course of the weekend, a second caller whose phone number is entered in the list of contacts of the user equipment 110 of the user and who is preparing to make a video call to the user, is provided, after displaying the phone number of the user in a list of contacts in the second user equipment 110 of the caller, with a real-time graphic notice of the second (semi-public) status of the user. Thus, potential callers, whose phones numbers are entered in the list of contacts of the user equipment 110 of the receiver are only displayed the second (semi-public) status.

Example 3

As a further example of embodiments of the present disclosure for sharing information about the time availability of a user of a user equipment 110, a status of the user is received from the user equipment 110 of the receiver by the server 105 via the communications network 115. In the present example, the status is automatically received after the loss of a cellular signal of the user equipment 110 of the receiver. For instance, the status may be received while the user is on an airplane, and the user equipment 110 becomes disconnected from the communications network 115. The status is public and includes information about the current unavailability of the user. In addition, the status contains information that the user equipment 110 of the receiver is now disconnected from the communications network 115, or switched off. In the present case, however, the status is neither an automatic provision of data or information regarding the position of the user. Thus, embodiments of the present disclosure may not be used by callers or third parties for any form of monitoring, search, or geolocation tracking. Next, each caller who is preparing to make a phone and/or video call to the user is provided with a real-time graphic, textual, or audio notice of the status of the user.

Alternatively, the status of the user may be set to only notify preselected callers, such as friends and family while allowing the general public or other to just ring through to voicemail without any status message or notification of the user. Further, the number of rings before having a call go to voicemail may also be set by the user even when the user equipment 110 is turned off. In other words, the caller will not be able to infer whether the user's phone or device is turned on or off by going directly to voicemail when turned off for possible privacy purposes.

After the user equipment 110 of the receiver is switched on again and/or reaches the signal of the communications network 115, the user equipment 110 of the caller will alert the caller about the availability of the previously unavailable user, whom the caller has previously attempted to call, without success.

To ensure quick distribution of the user's status, or follow-up notices, certain embodiments of the present disclosure, as discussed above, may provide for the user's statuses or notices to be continuously provided, or periodically pushed, from the server device to the user equipment 110 of the caller to be recorded or saved. Thus the current availability of the user may be provided to the calendar, contacts list, and/or the list of the called numbers of the user equipment 110 of the caller without the user equipment 110 of the caller being required to query the server device 105 or the user equipment 110 of the receiver. In addition, however, embodiments of the present disclosure contemplate that the user equipment 110 of the caller may be required to query the server device 105 to obtain the user's status, or follow-up notices. Such a query by the user equipment 110 of the caller may occur after the user's phone number is dialed, or displayed, in the user equipment 110 of the caller. In such embodiments, the user's status, or follow-up notices, may be obtained by the server device 105 after the server device 105 queries the user equipment 110 of the receiver. Alternatively, the user's status may be automatically, or periodically updated, from the user equipment 110 of the receiver to the server device 105.

In some embodiments, user equipment 110 may include a Global Positioning System (GPS), where the GPS may be configured to block incoming calls when the user equipment 110 is geolocated, for example, at school, work, movies, golfing, etc. In other embodiments, user equipment 110 may include at least one camera, where the camera may be configured to capture the user's activity and absent a suitable animated icon, the captured activity may be included in the status message or indicator to the caller if permissions are provided by the user to do so.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for facilitating time appropriate communication between users using network connected communication devices, comprising:
 a receiving device having processing circuitry and memory; and
 a server having processing circuitry and memory,
 wherein the processing circuitry of the receiving device is configured to
  determine availability information of a user corresponding to the receiving device, where the availability information includes an availability status for the user and a time point at which the availability status will change,
  send the availability information to the server,
  determine whether the availability status of the user has been updated and generate updated availability information when the availability status of the user has been updated, and
  send any updated availability information to the server,
 wherein the processing circuitry of the server is configured to
  receive the availability information and any updated availability information from the receiving device,
  continuously determine the availability status of the user based on the availability information and any updated availability information,
  forward incoming calls to the receiving device from a sending device when the availability status of the user is determined to be available, and
  direct incoming calls to voicemail from the sending device and to send a status indicator to the sending device representing the availability status of the user when the availability status of the user is determined to be unavailable, wherein the receiving device
sends an alert message to the sending device in response to the receiving device changing availability status from unavailable to available,
sends the alert message at random to sending devices that attempted to call the sending device to prevent all sending devices from making additional concurrent attempts,
wherein configuration settings received from the receiving device include an auto-reply configuration triggered by incoming communications from the sending device without the need for real-time input from the user,
wherein the auto-reply circuit is configured as an animated icon to be sent to the sending device, and
wherein the animated icon changes form, motion and color to indicate that the user is now available.

2. The system according to claim 1, wherein the auto-reply circuitry is configured to reply with a text displaying a predetermined time interval indicating the user's availability to be sent to the sending device.

3. The system according to claim 1, wherein the animated icon is selected by the user to match or imitate an activity of the user for which the user is unavailable.

4. The system according to claim 1, wherein calls from predetermined sending devices are forwarded to the receiving device even when the availability status of the user is determined to be unavailable.

5. The system according to claim 4, wherein the predetermined sending devices correspond to emergency service calls.

6. The system according to claim 1, wherein the availability information and the alert message are in a language corresponding to a language of a user of the sending device.

7. The system according to claim 1, wherein the alert message is configured to update a calendar of the sending device indicating availability of the receiving device.

8. The system according to claim 1, wherein the availability status is based on a location of the receiving device.

9. The system according to claim 1, wherein the availability status is based on a signal strength of the receiving device.

10. A method, comprising:
providing a mobile application including program code to be executed on a receiving device having processing circuitry and memory;
sending configuration settings to a server having processing circuitry and memory;
sending an availability status of the user via the receiving device to the server;
determining whether the configuration settings or the availability status of the user has been updated via the receiving device;
determining availability information of a user corresponding to the receiving device, where the availability information includes the availability status for the user and a time point at which the availability status will change;
sending an updated availability status of the user via the receiving device to the server;
receiving incoming calls from a sending device having processing circuitry and memory via the server based on the updated availability status of the user,
sending an alert message to the sending device in response to the receiving device changing availability status from unavailable to available; and
sending the alert message at random to sending devices that attempted to call the sending device to prevent all sending devices from making additional concurrent attempts,
wherein the configuration settings include an auto-reply configuration triggered by incoming communications from the sending device without the need for real-time input from the user,
wherein the auto-reply is configured as an animated icon to be sent to the sending device, and
wherein the animated icon changes form, motion and color to indicate that the user is now available.

11. The method according to claim 10, wherein the animated icon changes form, motion and color to indicate that the user is available.

12. A non-transitory computer readable medium encoded with instructions that, when executed in hardware, perform a process, the process comprising the method according to claim 10.

13. A method, comprising:
providing a mobile application including program code to be executed on a server having processing circuitry and memory;
receiving configuration settings via a receiving device;
receiving an availability status of the user via the receiving device;
determining whether the configuration settings or the availability status of the user has been updated via the receiving device;
determining availability information of a user corresponding to the receiving device, where the availability information includes the availability status for the user and a time point at which the availability status will change;
intercepting and blocking incoming calls to the receiving device from a sending device and sending a status indicator to the sending device representative of the availability status of the user;
receiving an updated availability status of the user via the receiving device;
passing through incoming calls and outgoing calls to and from the receiving device and the sending device when the availability status changes from unavailable to available;
sending an alert message to the sending device in response to the receiving device changing availability status from unavailable to available; and
sending the alert message at random to sending devices that attempted to call the sending device to prevent all sending devices from making additional concurrent attempts,
wherein the configuration settings include an auto-reply configuration triggered by incoming communications from the sending device without the need for real-time input from the user,
wherein the auto-reply is configured as an animated icon to be sent to the sending device, and
wherein the animated icon changes form, motion and color to indicate that the user is now available.

14. The method according to claim 13, wherein the auto-reply circuitry is configured to reply with a text displaying a predetermined time interval indicating the user's availability to be sent to the sending device.

* * * * *